United States Patent [19]

Friedmann

[11] Patent Number: 5,169,365
[45] Date of Patent: Dec. 8, 1992

[54] POWER TRAIN

[75] Inventor: Oswald Friedmann, Lichtenau, Fed. Rep. of Germany

[73] Assignee: Luk Lamellen und Kupplungsbau GmbH, Bühl, Fed. Rep. of Germany

[21] Appl. No.: 778,462

[22] Filed: Oct. 16, 1991

[30] Foreign Application Priority Data

Oct. 20, 1990 [DE] Fed. Rep. of Germany ....... 4033479

[51] Int. Cl.⁵ .............................................. F16H 59/00
[52] U.S. Cl. .......................................... 474/18; 474/69
[58] Field of Search ...................... 474/11, 12, 17, 18, 474/28, 69, 70; 74/866-869

[56] References Cited

U.S. PATENT DOCUMENTS

| 5,021,031 | 6/1991 | Hibi | 474/18 |
| 5,046,991 | 9/1991 | Friedmann | 474/18 |
| 5,112,280 | 5/1992 | Sato | 474/18 |

FOREIGN PATENT DOCUMENTS

2828347 10/1982 Fed. Rep. of Germany.
3538884 5/1989 Fed. Rep. of Germany.
4011850 10/1990 Fed. Rep. of Germany.

Primary Examiner—Thuy M. Bui
Attorney, Agent, or Firm—Peter K. Kontler

[57] ABSTRACT

A power train for use in a motor vehicle has an infinitely variable transmission with two sheaves and a belt which is trained over the sheaves. The sheaves have fixed and axially movable flanges, and one of the sheaves is driven by the engine through a torque sensor. A first hydraulic circuit has a first pump which can supply pressurized oil to the hydraulic motors for the axially movable sheaves at a pressure determined by the torque sensor. A second hydraulic circuit has a second pump serving to supply pressurized oil to a further motor which varies the ratio of the transmission and to two friction clutches between the second sheave and an output member. The pressure of oil in the second circuit is determined by a pressure regulating valve which is adjustable by a control unit in dependency on one or more parameters of the engine. A first distributing valve can connect the second pump with the further motor and/or with one of the two clutches, and a second distributing valve can connect the first distributing valve with the one or the other clutch. One of the clutches can drive the output member in a first direction, and the other clutch can drive the output member by way of a planetary in a second direction counter to the first direction.

28 Claims, 1 Drawing Sheet

POWER TRAIN

BACKGROUND OF THE INVENTION

The invention relates to power trains, especially to power trains which can be installed between the engines and the wheels of motor vehicles. More particularly, the invention relates to improvements in power trains which operate with infinitely variable transmissions of the type employing two adjustable sheaves and an endless flexible torque transmitting element which is trained over the sheaves. Transmissions of the just outlined character are described and shown, for example, in commonly owned U.S. Pat. No. 5,046,991 granted Sep. 10, 1991 to Friedmann for "Continuously Variable Speed Transmission" and in commonly owned copending patent application Ser. No. 07/616,371 filed Nov. 21, 1990 by Friedmann for "Continuously Variable Transmission". Still more particularly, the invention relates to improvements in power trains of the type wherein a continuously variable transmission can drive one or more pairs of wheels in a motor vehicle by way of one or more engageable and disengageable clutches which are connected in series with the transmission.

Power trains of the above outlined character are disclosed, for example, in German Pat. No. 28 28 347 granted Oct. 21, 1982 to Rattunde and in German patent application No. 35 38 884 (published May 21, 1987) of Svab. The power trains of Rattunde and Svab employ a torque sensor which is installed between the engine of a motor vehicle and the input member of the transmission and constitutes a torque-responsive valve. The valve receives pressurized fluid from a pump. The arrangement is such that the valve is closed, at least in part, in response to abrupt rise of torque in order to effect an appropriate increase of fluid pressure in the motors (such as cylinder and piston units) which are employed to move the axially movable flanges of the sheaves relative to the axially fixed flanges. This results in more pronounced engagement between the flanges of the sheaves and the adjacent portions of the endless torque transmitting element which is trained over the sheaves. The valve which constitutes or forms part of the torque sensor comprises two discs having confronting ramps for rolling elements which are installed between the discs. The discs are biased toward each other, and hence against the rolling elements between them, by fluid pressure which is generated by the pump. When the torque which is transmitted from the engine to the input member of the transmission by way of the valve undergoes a pronounced increase, one of the discs turns relative to the other disc whereby the rolling elements move the discs apart and the axially movable disc alters the rate of flow of pressurized fluid from the valve. This entails a rise of fluid pressure and an increase of the force which the flanges of the sheaves exert against the adjacent portions of the torque transmitting element. The discs of the valve which forms part of or constitutes the torque sensor not only regulate the pressure of fluid as a function of the magnitude of transmitted torque but they also serve as a means for transmitting torque from the engine to the transmission. The pump must be designed to supply fluid at a very high pressure because the two discs and the rolling elements of the valve (which receives pressurized fluid from the pump) must transmit torque from the engine to the input member of the transmission. A considerable amount of pressurized fluid is permitted to escape from the valve so that losses due to leakage of pressurized fluid are quite high.

The same pump is used to adjust the ratio of the infinitely variable transmission. To this end, the power trains of Rattunde and Svab employ a regulating valve (e.g., a complex slide valve) which controls the pressure in the cylinder and piston units for the axially movable flanges of the sheaves. Thus, the regulating valve can raise the pressure in one of the units while reducing the pressure in the other unit to thus ensure a radial displacement of the torque transmitting element and hence a change of the transmission ratio.

A drawback of the just described conventional power trains is that the pump must deliver fluid at an elevated pressure which is several times the pressure required for changing the transmission ratio. This is due to the fact that the same pump also serves to raise the pressure of fluid in response to changes of transmitted torque. At the same time, the pump must convey the fluid at a high rate in order to ensure that the transmission ratio can be changed very rapidly in spite of the elevated pressure of conveyed fluid. Otherwise stated, losses of pressurized fluid are very high and continuous. Such losses are proportional to the rate of fluid flow at the aforediscussed elevated pressures. In addition, the conventional power trains employ a number of complex and expensive flow controlling and other regulating components which are prone to malfunction.

OBJECTS OF THE INVENTION

An object of the invention is to reduce losses of pressurized fluid in power trains which employ infinitely variable transmissions with pairs of sheaves and endless flexible torque transmitting elements.

Another object of the invention is to provide a simple, compact and inexpensive power train which can be utilized with advantage in motor vehicles for transmission of torque between an engine and the wheels.

A further object of the invention is to provide a power train whose operation can be regulated in dependency on any desired practical number of parameters.

An additional object of the invention is to provide a highly reliable power train which requires a relatively small number of complex components such as proportional valves, control units and others.

Still another object of the invention is to provide a novel and improved method of starting a power train of the above outlined character.

A further object of the invention is to provide a novel and improved combination of torque sensor means, infinitely variable transmission and one or more clutches for use in the above outlined power train.

Another object of the invention is to provide a motor vehicle which employs the above outlined power train.

An additional object of the invention is to provide a power train wherein the shifting from operation in forward direction to operation in reverse can be effected in a novel and improved way.

Another object of the invention is to provide a power train wherein the system which is used to alter the ratio of the transmission cannot unduly influence the system which adjusts the operation of the transmission in dependency on the magnitude of transmitted torque and vice versa.

SUMMARY OF THE INVENTION

The invention is embodied in a power train which can be utilized with advantage in a motor vehicle. The improved power train comprises at least one engageable and disengageable clutch (such as a friction clutch), fluid-operated means (e.g., a distributing valve) for engaging the at least one clutch, and an infinitely variable transmission which is in series with the at least one clutch and includes a first rotary sheave serving to receive torque from a prime mover (such as the engine of a motor vehicle), a second rotary sheave which is connected with the at least one clutch, and an endless flexible torque transmitting element (such as a chain or a belt) which is trained over the sheaves. Each sheave comprises a first flange and a second flange which is movable axially toward and away from the respective first flange, and the transmission further comprises first and second fluid-operated motors for the second flanges of the first and second sheaves, respectively The power train further comprises a torque sensor which is connected with the prime mover, means for varying the ratio of the transmission, at least one source of pressurized fluid, a first circuit (particularly a hydraulic circuit) which connects the at least one source with the motors for the second flanges and with the torque sensor, and a second circuit which connects the at least one source with the varying means and/or with the engaging means. The second circuit comprises an adjustable pressure regulating device.

At least one of the motors for the second flanges can comprise a cylinder and piston unit, and the varying means can comprise a further fluid-operated motor having means for moving the second flange of one of the sheaves. The pressure regulating device can comprise a valve (such as an adjustable proportional valve), and the power train preferably further comprises at least one control unit having means for adjusting the valve as a function of at least one of a plurality of different parameters, e.g., as a function of at least one parameter of the prime mover.

The power train preferably further comprises means for selectively connecting the valve with the engaging means or with the further motor. The arrangement is preferably such that the connecting means is adjustable to connect the valve with the engaging means preparatory to start of transmission of torque from the prime mover to the first sheave. The connecting means is preferably adjustable to connect the valve of the pressure regulating device with the engaging means preparatory to start of transmission of torque from the prime mover to the transmission.

The at least one clutch preferably constitutes a friction clutch, and the connecting means can be designed in such a way that it is adjustable to connect the engaging means in the first circuit immediately or at least shortly upon complete engagement of the at least one clutch. The connecting means can comprise a distributing valve in the two circuits, and such distributing valve is connected with the engaging means and with the varying means. This distributing valve is further connected with the valve of the pressure regulating device. The distributing valve can constitute a 5/3-way or a 5/2-way valve. The distributing valve can be connected to and is then adjustable by the at least one control unit as a function of at least one of a plurality of parameters. Such parameters include, for example, the rate of delivery (e.g., by a gas pedal) of fuel to the engine which preferably constitutes the prime mover, the RPM of the engine, the RPM of the second sheave or of an output member which is driven by the second sheave by way of the at least one clutch, and the position of a gear shift member (e.g., a customary lever) for the engine.

Still another object of the invention is to provide a novel and improved combination of distributing, pressure regulating and other valves for use in the above outlined power train.

The valve of the pressure regulating device can constitute an electrically adjustable valve, and the parameters which are relied upon to adjust the electrically adjustable valve can include the rate of delivery of fuel to the engine which preferably constitutes the prime mover for the transmission, the RPM of the engine, the RPM of an output member which is driven by the transmission or by the clutch, and the position of the aforementioned gear shift member for the engine.

The at least one source of pressurized fluid (such as oil) can include a first pump in the first circuit and a second pump in the second circuit. Such power train preferably comprises a pressure relief valve in the second circuit between the output of the second pump and the fluid-receiving port or ports of the valve of the pressure regulating device.

The power train can comprise two fluid-operated engageable and disengageable friction clutches which are installed in series with the second sheave. The engaging means of such power train includes means for selectively engaging one of the clutches at a time, and such power train can further comprise a planetary transmission (hereinafter called planetary for short) which is connected with and serves to receive torque from one of the two clutches. The planetary further comprises a rotary output member, e.g., a shaft which can drive an axle for one or more pairs of wheels in a motor vehicle. The one clutch has means for rotating the output member through the medium of the planetary in a first direction (e.g., in a direction to drive the motor vehicle in reverse), and the other clutch has means for rotating the output member in a second direction counter to the first direction (for example, to drive the vehicle in a forward direction). The aforementioned connecting means can include a first distributing valve, and the engaging means can comprise a second distributing valve which is adjustable to connect the first distributing valve with the one or the other clutch. The second distributing valve can constitute a 4/2-way valve. At least one of the two clutches can comprise a substantially piston-like portion (e.g., a pressure plate) which is movable in a first direction to effect the engagement and in a second direction to effect the disengagement of the at least one clutch. The at least one clutch can further comprise means for yieldably biasing the substantially piston-like portion of the at least one clutch in the first direction. For example, the biasing means can comprise one or more dished springs, one or more coil springs and/or one or more diaphragm springs.

The torque sensor can comprise a valve which is connected in the first circuit and has at least one fluid discharging outlet, and the power train can further comprise an adjustable or non-adjustable pressure regulating valve in the outlet. The substantially piston-like portion of the at least one clutch can be biased in a direction toward engagement of the at least one clutch with a predetermined force which is counteracted by the pressure regulating valve at the outlet of the torque sensor in such a way that this valve maintains the pressure of fluid in the torque sensor at a level to at least substantially compensate for the predetermined force.

The further motor which constitutes or forms part of the varying means is preferably designed to move the second flange of the first sheave and operates in parallel with the first motor.

The transmission can further comprise means for yieldably biasing one of the second flanges toward the respective first flange, preferably for biasing the second flange of the second sheave toward the respective first flange. The biasing means can comprise at least one spring, for example, a package of dished springs.

The novel features which are considered as characteristic of the invention are set forth in particular in the appended claims. The improved power train itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The single Figure of the drawing is a diagrammatic partly elevational and partly sectional view of a power train which can be utilized in a motor vehicle and employs two friction clutches one of which is operative when the vehicle is to be driven forwardly and the other of which is operative when the vehicle is to be driven in reverse.

DESCRIPTION OF PREFERRED EMBODIMENTS

Figure 1:
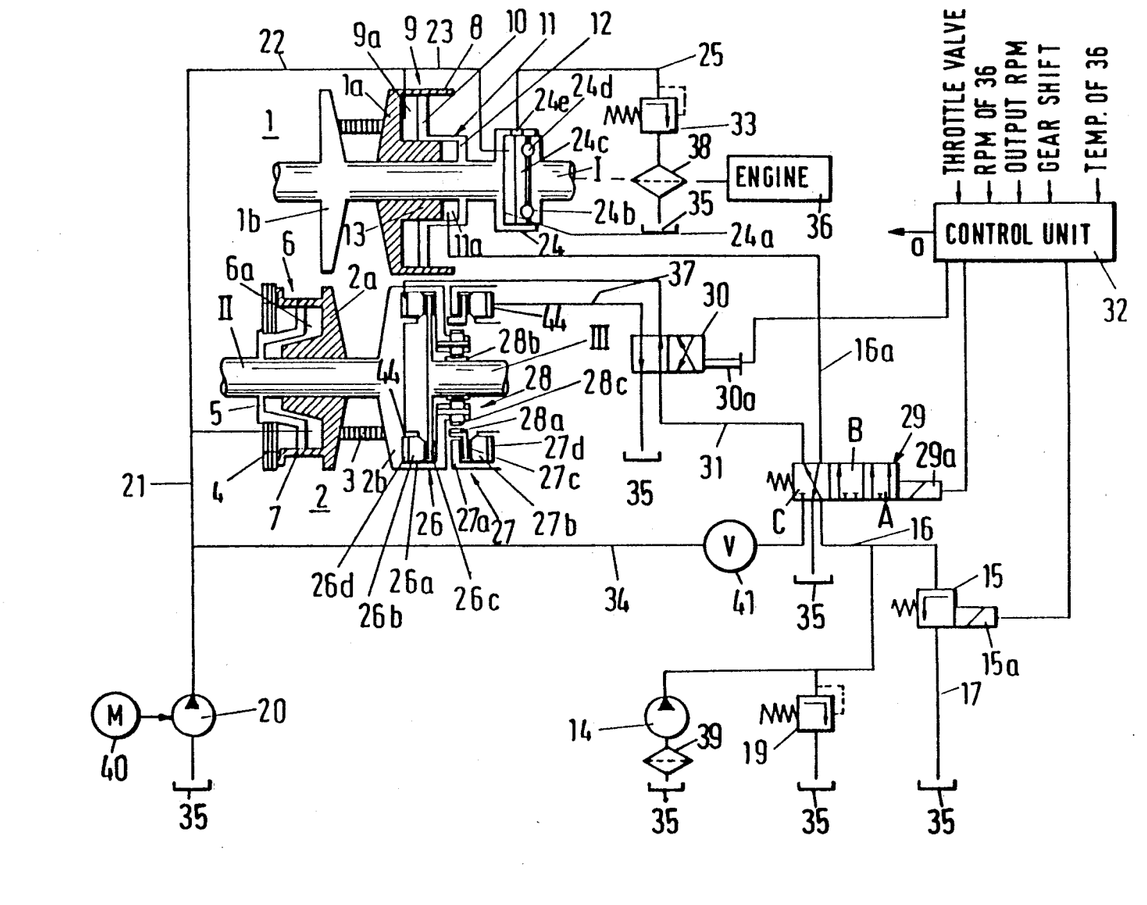

The drawing shows a power train which can be utilized between the engine 36 and one or more pairs of wheels (not shown) in a motor vehicle. The power train includes an infinitely variable transmission which is in series with two friction clutches 26 and 27 serving to transmit torque to the wheels in a manner not forming part of the present invention.

The transmission comprises a rotary input member I which receives torque from the engine 36 and carries a first sheave 1, and a rotary output member II which can transmit torque to the engaged clutch 26 or 27 and carries a second sheave 2. The sheave 1 comprises two coaxial conical flanges 1a, 1b which share the rotary movements of the input member I, and the sheave 2 comprises two coaxial conical flanges 2a, 2b which share the rotary movements of the output member II. The flanges 1a, 2a are movable axially toward and away from the respective fixedly mounted flanges 1b and 2b. An endless flexible torque transmitting element 3 is trained over the sheaves 1, 2 in such a way that it includes a first looped portion between the confronting conical surfaces of the flanges 1a, 1b and a second looped portion between the confronting conical surfaces of the flanges 2a, 2b.

The axially movable flange 2a is permanently biased toward the flange 2b by a resilient element here shown as a package of dished springs 4 having radially inner portions which react against an external shoulder of a piston 5 that is integral with the output member II. The radially outer portion of the package of dished springs 4 bears against the open end of a cylinder 7 which forms part of a fluid-operated motor 6. The latter further includes the piston 5 which cooperates with the cylinder 7 to define an annular cylinder chamber 6a surrounding a portion of the output member II. The characteristic of the package of springs 4 is such that the force which the springs exert upon the endless flexible element 3 (e.g., a belt or chain and hereinafter called chain) is greater when the first looped portion of the chain is nearer to the axis of the input member I Such force is smaller when the first looped portion of the chain 3 is more distant from the axis of the input member I. The cylinder 7 can form an integral part of the axially movable flange 2a, i.e., the package of springs 4 can be said to bear against the flange 2a.

The axially movable flange 1a of the sheave 1 is integral with a cylinder 8 which forms part of a second fluid-operated motor 9, and this motor further includes a washer-like piston 10 which is integral with the input member I and extends into the cylinder 8 to define with the latter an annular cylinder chamber 9a.

A further fluid-operated motor 11 serves as a means for varying the ratio of the transmission including the input member I, the output member II, the sheaves 1, 2 and the chain 3. The motor 11 is confined within the cylinder 8 of the motor 9 and includes a cylinder 12 integral with the piston 11 and with the input member I, and a piston 13 which is integral with the axially movable flange 1a (and hence with the cylinder 8). The cylinder chamber of the motor 11 which constitutes the transmission ratio varying means is shown at 11a. It will be noted that the motors 9 and 11 are mechanically connected with each other and operate in parallel.

The input member I (which receives torque from the engine 36) further serves to drive a pump 14 which is installed in a hydraulic circuit including conduits 16, 16a, 17. The pump 14 draws a hydraulic fluid (e.g., oil and hereinafter called oil for short) from the sump 35, and the conduit 17 returns oil into the sump 35 at a rate which is determined by a pressure regulating device 15 here shown as a simple slide valve. This valve controls the motor 11, i.e., the ratio of the infinitely variable transmission, and is adjustable by an electronic control unit 32 through the medium of an adjusting means here shown as a solenoid 15a. Thus, the position of the valving element relative to the body of the valve 15 will be selected in dependency upon the desired or required ratio of the infinitely variable transmission. The conduit 16 of the hydraulic circuit including the conduits 16, 16a and 17 can admit pressurized oil into the cylinder chamber 11a of the motor 11 by way of the conduit 16a in response to appropriate adjustment of a connecting means here shown as a distributing or regulating valve 29 which is installed between the conduits 16 and 16a.

The valving element of the valve 15 is movable between a first position in which the valve 15 permits pressurized oil to flow from the pump 14 into the conduit 16a and thence into the cylinder chamber 11a (the oil in the chamber 11a then causes the first looped portion of the chain 3 to move away from the axis of the input member I against the opposition of the package of dished springs 4) and a second position in which the conduit 7 returns oil from the conduit 16 into the sump 35. The valving element of the valve 15 can also assume any one of a plurality of intermediate positions.

A filter 39 is provided between the sump 35 and the intake of the pump 14. A preferably adjustable pressure relief valve or safety valve 19 is installed in the hydraulic circuit between the outlet of the pump 14 and the sump 35 to open when the oil pressure in the conduit 16 reaches a preselected maximum permissible value.

The cylinder chamber 11a of the motor 11 is relatively small; therefore, the pump 14 is required to circulate a relatively small quantity of oil, namely an amount which is approximately one-fourth of the amount required to fill the cylinder chamber 11a to capacity. This reduces the energy requirements and increases the efficiency of the pump 14 and of the transmission above that of a conventional transmission utilizing a pair of sheaves and an endless flexible torque transmitting element.

A pump 20 is provided to supply pressurized oil from the sump 35 to a hydraulic circuit including conduits 21, 22 and 23. The conduit 21 communicates with the cylinder chamber 6a of the motor 6, the conduit 22 communicates with the cylinder chamber 9a of the motor 9, and the conduit 23 communicates with the cylinder chamber 24a of a torque sensor 24 between the engine 36 and the input member I. The torque sensor 24 regulates the pressure in the cylinder chambers 6a and 9a as a function of the magnitude of selected or transmitted torque. The illustrated torque sensor 24 is a torque-regulated valve which is installed between the engine 36 and the input member I or between the input member I and the flanges 1a, 1b of the sheave 1 to transmit torque from the engine 36 to the sheave 1. A valve which can be used as a torque sensor and is similar to the torque sensor 24 is described and shown in the aforementioned German Pat. No. 28 28 347 to Rattunde and in the aforementioned commonly owned U.S. Pat. No. 5,046,991 to Friedmann. The valve 24 comprises a fixed disc 24b which can be an integral part of the input member I or of the output element of the engine 36, an axially movable disc 24c which is installed in the cylinder chamber 24c and acts not unlike a piston, and one or more spherical rolling elements or followers 24d which are installed between neighboring ramps or cams of the discs 24b and 24c. The cylinder of the valve 24 has at least one outlet in the form of a port 24e which can discharge pressurized oil into the sump 35 at a rate dependent on the axial position of the disc 24c, namely on the magnitude of torque which is transmitted from the engine 36 to the sheave 1. When the magnitude of transmitted torque increases, the rolling elements 24d move the disc 24c axially and away from the disc 24b whereby the disc 24c reduces the effective area(s) of the outlet port(s) 24e and hence the rate of flow (leakage) of pressurized oil from the conduit 23 of the second hydraulic circuit into the sump 35. This raises the pressure in the cylinder chambers 6a and 9a accordingly, i.e., the pressure in these chambers is a function of the magnitude of torque which is being transmitted to the input member I and to the flanges 1a, 1b of the sheave 1. Since the motors 9 and 11 are connected in parallel, the force which is applied to the flange 1a of the sheave 1 by the pressurized oil in the cylinder chamber 9a is added to the torque-dependent force which is applied to the piston 13 (i.e., to the flange 1a) by pressurized oil in the cylinder chamber 11a.

The amount of oil which is circulated by the pump 20 is relatively small, i.e., this pump must merely compensate for leakage of oil from the cylinder chamber 24a via outlet port(s) 24e, for eventual other leakage of oil (e.g., from the conduit 21, 22 and/or 23) and for expansion of conduits and/or for expansion of other oil-confining parts in response to a rise of oil pressure therein. Save for compensation of losses due to leakage, it is not necessary to generate hydraulic energy in order to establish a fluid pressure which is proportional to transmitted torque because a compensation for changes of transmission ratio by the motor 11 merely involves a flow of oil into the cylinder chamber 9a and simultaneous outflow of oil from the cylinder chamber 11a or vice versa. The required output of the pump 20 is approximately one-sixth of the overall output of a corresponding pump in a heretofore known infinitely variable transmission with sheaves and an endless torque transmitting element. In addition, the sum of outputs of the composite fluid source including the pumps 14 and 20 is also a mere fraction of the required sum of outputs of corresponding pumps in heretofore known transmissions The clutch 26 or 27 is used to transmit torque from the output member II of the infinitely variable transmission to a further (second) output member III which serves to transmit torque to the axle or axles for one or more pairs of wheels or the like, not shown. Thus, the flow of power is from the engine 36, through the torque sensor valve 24, input member I, sheave 1, chain 3, sheave 2, output member II, clutch 26 or 27 and output member III. The arrangement is such that the clutch 26 serves to transmit torque from the output member II to the output member III in a first direction (e.g., in a forward direction) whereas the clutch 27 serves to transmit torque from the output member II to the output member III in a second direction (e.g., in reverse) counter to the first direction.

The clutch 26 which is shown in the drawing comprises a first portion or part 26a which is secured to (e.g., integral with) the output member II and has a first friction surface, and a piston-like second portion or part 26b which is non-rotatably but axially movably secured to the first part 26a and has a second friction surface spaced apart from and confronting the friction surface of the part 26a. A clutch plate or clutch disc 26c is located between the parts 26a, 26b and is rigid (e.g., integral) with the output member III. The friction lining or linings of the clutch plate 26c are engaged by the friction surfaces of the parts 26a, 26b when the clutch 26 is engaged, namely when an annular plenum chamber 26d of the clutch 26 receives pressurized oil from the pump 14 via conduit 16, distributing valve 29, a conduit 31, and an engaging means here shown as a second distributing or regulating valve 30.

The second clutch 27 comprises a counter-pressure plate 27a which is rigid with a transmission case or housing and has a first friction surface, and a piston-like pressure plate 27b which is axially movable relative to the counterpressure plate 27a and has a second friction surface confronting the first friction surface. The pressure plate 27b cannot rotate relative to the counter-pressure plate 27a, and the clutch 27 further comprises a clutch plate or clutch disc 27c having friction linings which are engaged by the two friction surfaces when the pressure plate 27b is moved axially toward the counter-pressure plate 27a in response to admission of pressurized oil into a plenum chamber 27d of the clutch 27. The plenum chamber 27d can receive pressurized oil in response to appropriate adjustment of the distributing valves 29 and 30; at such time, pressurized oil flows from the conduit 16 into the conduit 31 and thence into a conduit 37. At the same time, the second distributing valve 30 seals the chamber 27d from the sump 35.

The clutch plate 27c carries the ring gear 28a of a planetary 28 which further includes a sun gear 28b rigid with the second output member III. Planet pinions 28c mate with the ring gear 28a as well as with the sun rotatably mounted on the part 26a of the first friction clutch 26.

The piston-like part 26b and the pressure plate 27b are biased by energy storing devices 44, e.g., diaphragm springs in a direction to disengage the respective friction clutches 26 and 27. Thus, when the pressure of oil in the chambers 26d, 27d drops, the clutches 26 and 27 are completely or nearly completely disengaged to thus ensure that no torque (not even a drag torque) is being transmitted to the clutch plates 26c and 27c.

The distributing valve 29 is installed in each of the two hydraulic circuits which include the conduits 16, 16a, 17 and 21, 22, 23. Thus, the valve 29 can establish a path for the flow of pressurized fluid from the pump 14 or from the pump 20, and an outlet port of the valve 29 can admit pressurized oil into the cylinder chamber 11a of the motor 11 or into the plenum chamber 27d of the second friction clutch 27 or (in response to resetting of the distributing valve 30) into the plenum chamber 26d of the first friction clutch 26. Thus, the distributing valve 29 can influence the ratio of the infinitely variable transmission or it can engage or permit disengagement of the friction clutch 26 or 27. The valve 29 which is shown in the drawing is a so-called 5/3-way distributing or regulating valve, and the illustrated distributing or regulating valve 30 is a so-called 4/2-way valve.

The valve 29 can be adjusted in dependency upon a plurality of different parameters in response to signals from the corresponding output of the electronic control unit 32. The solenoid of the valve 29 is shown at 29a. The clutch 26 or 27 can be engaged in response to appropriate changes of one or more parameters of the engine 36 which drives the input member I. The plenum chambers 26d, 27d of the clutches 26, 27 can receive pressurized oil from the hydraulic circuit including the conduits 21-23 (i.e., from the circuit which further includes the pump 20 and wherein the pressure of oil is a function of transmitted torque) or from the hydraulic circuit including the conduits 16, 16a, 17 which further includes the pump 14 and wherein the pressure of oil is a function of the adjustment of the pressure regulating valve 15.

The purpose of the second distributing valve 30 is to ensure that the clutch 26 is engaged (because its plenum chamber 26d is sealed from the sump 35) when the clutch 27 is disengaged (because its plenum chamber 27 is connected with the sump 35) and vice versa. Otherwise stated, signals from the control unit 32 to the solenoid 30a for the distributing valve 30 determine the direction of movement of the motor vehicle in which the power train including the structure which is shown in the drawing is put to use. The distributing valve 30 can be adjusted by hand or by the solenoid 30a, i.e., in response to signals from the corresponding output of the control unit 32. The illustrated control unit 32 has inputs which can receive signals denoting the position of the throttle valve, the RPM of the engine 36, the output RPM, the position of the gear shift member (e.g., a lever) and the temperature of the engine 36.

The drawing shows the valving elements of the distributing valves 29 and 30 in those axial positions which the valving elements assume preparatory to starting the power train, i.e., preparatory to start of transmission of torque from the input member I to the second output member III. The friction clutch 26 is engaged (i.e., the motor vehicle is ready to be driven in a forward direction), and the friction clutch 27 is disengaged. Thus, the plenum chamber 26d can receive pressurized oil from the pump 14 via distributing valves 29, 30, and the pump 14 delivers into the conduit 16 oil at a pressure which is dependent upon the adjustment of the pressure regulating valve 15 by the control unit 32. At such time, the adjustment of the valve 15 is a function of the position of the throttle valve (i.e., of the rate of admission of fuel into the cylinder or cylinders of the engine 36). Furthermore, the pressure of oil in the plenum chamber 26d can be a function of the slip of the friction clutch 26 and, if necessary or desired, a function of one or more additional parameters, such as the temperature of the engine 36, the position of the gear shift member (this member selects the transmission ratio such as direct drive (D), sporty drive (DS), forward drive (DE), drive in reverse (R), neutral position (N) and parking (P)). The control unit 32 can include a processor with a memory which can be addressed to furnish information pertaining to the initial or starting phase of operation of the motor vehicle. The signals which the control unit 32 receives are updated, either continuously or intermittently, preferably during each stage of operation of the motor vehicle. A different set of signals can be generated for each and every position and/or for each and every mode of operation of the fuel supplying element, such as a gas pedal.

The pressure regulating valve 15 can include or constitute a proportional valve which receives from the control unit 32 electric signals having an intensity or another characteristic representative or indicative of one or more parameters which are to influence the pressure of oil in the conduit 16. Such parameters can denote the information which is stored in the memory of the control unit 32 or information denoting one or more parameters which vary in the course of the starting operation and are continuously monitored by one or more sensors. For example, the starting operation can begin when the RPM of the engine 36 is within a particular range which corresponds to a selected position of the gas pedal. If the actual RPM of the engine 36 (i.e., of the input member I) is less than the desired RPM, the valve 15 causes the pressure of oil in the conduits 16 and 31 to rise. This is accomplished in that the potential which is applied to the solenoid 15a is altered accordingly with the result that the engagement of the friction clutch 26 is more pronounced, i.e., the slip of the clutch 26 is reduced.

The torque sensor 24 performs the additional function of ensuring that, during the starting and torque increasing stages, abrupt changes of torque or any changes of transmitted torque cause the flanges 1a, 1b and 2a, 2b of the sheaves 1 and 2 to bear against the adjacent portions of the chain 3 with a correspondingly increased or reduced force. This ensures that the flanges of the sheaves 1, 2 cannot slip relative to the chain 3 and/or vice versa. Thus, the circulation of pressurized oil is subject to automatic mechanical regulation, i.e., without relying on electronic parts and without any interference from the outside, while the power train is in the process of starting the transmission of torque from the engine 36 to the second output member III. Such automatic regulation of pressure in the hydraulic circuit 21-23 takes place in response to signals from the torque sensor 24 (i.e., in response to changes of axial position of the disc 24c) and renders it possible to considerably reduce the cost of the power train because only the valve 15 constitutes or can constitute a relatively complex and expensive proportional valve whereas the distributing valves 29, 30 are simple commercially available 5/3-way and 4/2-way valves. This is due to the fact that the valve 15 can be put to use during starting of the motor vehicle in forward or in reverse.

The invention is based on the recognition that starting of the infinitely variable transmission including the sheaves 1, 2 and the chain 3 does not necessitate an advance selection of the ratio of the transmission. The reason is that the package of dished springs 4 which act upon the axially movable flange 2a of the secondary sheave 2 invariably biases the flange 2a toward the flange 2b so that the conical surfaces of the flanges 2a, 2b engage the adjacent looped portion of the chain 3 with a requisite force and maintain the other looped portion of the chain 3 at an optimal distance from the axis of the input member I, i.e., the springs 4 select the optimum transmission ratio for the starting operation. At such time, the springs 4 ensure that the upper looped portion of the chain 3 is located at a minimal distance from the axis of the input member I and the lower looped portion of the chain 3 is located at a maximum distance from the axis of the output member II. Thus, the ratio of the infinitely variable transmission is the maximum step-down transmission ratio.

When the initial stage of the starting operation is completed, i.e., when the clutch 26 is engaged and operates without any slip or with a desirable optimum slip (such as is desirable or advantageous to compensate for eventual vibrations or for fluctuations of RPM of the output member II), the plenum chamber 26d of the friction clutch 26 is connected with the hydraulic circuit including the conduits 21-23 wherein the pressure of oil is a function of the momentarily transmitted torque. This is achieved by adjusting the distributing valve 29 through the medium of the solenoid 29a. The other hydraulic circuit including the conduits 16, 16a, 17 is simultaneously connected with the cylinder chamber 11a of the motor 11, i.e., of that component which determines the ratio of the transmission. At such time, the portion A of the valving element of the distributing valve 29 is effective to control the flow of oil in the conduits 16, 16a and 31. The portion B of the valving element of the distributing valve 29 ensures that, when this valving element is moved to the other end position for normal driving (note the portion C), the abrupt rise of pressure which is caused by the proportional valve 15 is not transmitted directly to oil in the cylinder chamber 11a of the motor 11 and cannot cause an abrupt change of the transmission ratio. Thus, the portion B of the valving element of the valve 15 effects a delay in the establishment of a connection between the pump 14 and the cylinder chamber 11a of the motor 11; such delay suffices to ensure that there is ample time to properly adjust the valve 15, namely to adjust the valve 15 with a view to ensure the establishment of desired oil pressure in the conduit 16.

The distributing valve 29 can be simplified (e.g., it can be replaced with a 5/2-way valve) if the proportional valve 15 is capable of reacting within a very short interval of time., i.e., it is then possible to dispense with a valving element which includes the median portion B.

The mode of operation during starting is analogous if the distributing valve 30 is adjusted so that the conduit 31 can deliver oil into the plenum chamber 27d of the valve 27 and the chamber 26d of the valve 26 is free to discharge oil into the sump 35.

One of the friction clutches 26, 27 is optional; thus, the power train can operate with a single clutch if the other clutch is replaced with other suitable means for changing the direction of rotation of the output member III. If the clutch 26 or 27 is omitted, the distributing valve 30 is also omitted.

The shifting of valving element of the distributing valve 29 from the one to the other end position should take place not later than when the ratio of the transmission is to be stepped up, i.e., in a sense to increase the RPM of the output member II and the speed of the motor vehicle.

When the vehicle is in motion, the valve 15 is adjusted to select in the conduits 16, 16a that pressure which is necessary for a selected transmission ratio. Such adjustment of the valve 15 takes place in dependency upon one or more parameters of the motor vehicle, particularly one or more parameters of the engine 36 and the parameter or parameters of the means (such as the gas pedal) for selecting the rate of admission of fuel to the engine 36.

The power train which is shown in the drawing further comprises a pressure regulating or pressure relief valve 33 which is installed in a conduit 25 connecting the outlet port or ports 24e of the torque sensor valve 24 with the sump 35. The purpose of the pressure regulating valve 33 is to ensure that the pressure in the chamber 24a of the torque sensor valve 24 cannot drop below a preselected threshold value, namely that the pressure of oil in the circuit including the conduits 21, 22, 23 and 25 cannot drop below a certain value even if the magnitude of transmitted torque is zero. For example, such minimum oil pressure in the conduits 21, 22, 23 and 25 can be in the range of 2 bar. The exact magnitude of minimal oil pressure in the conduits 21-23, 25 will depend on the restoring force of the energy storing means 44 (e.g., dished springs) which act upon the axially movable piston-like part 26b of the clutch 26 and/or upon the axially movable pressure plate 27b of the clutch 27 in a direction to disengage the respective clutches. As a rule, the minimum pressure in the circuit including the conduits 21-23 and 25 should be sufficient to ensure that, when the torque equals zero, the clutch 26 and/or 27 is maintained in a state of slip which ensures that the magnitude of torque capable of being transmitted from the output member II to the output member III is zero or does not exceed a predetermined minimal value. Otherwise stated, the purpose of the valve 33 in the conduit 25 is to ensure that, when the torque between the engine 36 and the input member I equals or closely approximates zero, the friction surfaces of the parts 26a, 26b are in contact with the friction linings of the clutch plate 26c in the clutch 26 and/or that the friction surfaces of the pressure plates 27a, 27b are in contact with the friction linings of the clutch plate 27c in the friction clutch 27. An advantage of such design and/or adjustment of the valve 33 is that the clutch 26 or 27 is not disengaged in response to a change of load, i.e., as a result of transition from positive to negative torque. This is due to the fact that, in urging the oil to flow from the conduits 21-23 into the conduit 25 and thence into the sump 35, the pump 20 must overcome the resistance which is offered by the valve 33; this ensures that the pressure in the conduits 21-23 is sufficiently high to maintain the clutch 26 or 27 in partly engaged condition. The closing or engaging force acting upon the clutch 26 or 27, when the transmitted torque equals or approximates zero, can be selected in such a way that the partially engaged clutch is incapable of transmitting any torque or can transmit a relatively small or medium torque which is sufficiently small to ensure reliable filtration or elimination of peaks of torque and/or of peaks of vibratory movements by permitting the output member II to slip relative to the output member III.

The pressure regulating valve 33 can constitute a non-adjustable valve or an adjustable valve. If the valve 33 is adjustable, it is connected to the output a of the control unit 32 or is connected to another adjusting unit. This renders it possible to adjust the valve 33 in dependency on one or more operational parameters, especially engine parameters such as the rate of fuel delivery to the engine 36 and/or the temperature of oil and/or others. This renders it possible to select the minimum resistance of the adjustable valve 33 to the flow of oil through the conduit 25 and into the sump 35 in dependency upon one or more factors, such as the aforementioned parameters. Thus, it is possible to select the pressure of oil in the conduits 21-23 and 25 in such a way that, when the magnitude of transmitted torque equals or approximates zero, the clutch 26 or 27 can transmit a selected torque, e.g., in dependency on the temperature of oil and/or in dependency on the rate of admission of fuel into the engine 36.

The conduit 25 preferably contains an oil filter The latter is shown at several different locations for the convenience of illustration.

At least one of the friction clutches 26, 27 can be regulated in dependency on one or more parameters in a manner as disclosed, for example, in commonly owned German patent application No. P 40 11 850.9 and/or in dependency on certain other parameters. The difference is that, in the structure which is disclosed in the German patent application No. P 40 11 850.0, the clutches are disengaged as a result of generation of hydraulic pressure; on the other hand, the power train of the present invention employ some or more friction clutches which are engaged in response to a rise of oil pressure (in the respective plenum chambers 26d, 27d).

The engine 36 can drive the pump 14 as well as the pump 20. Such engine can constitute an internal combustion engine. However, it is equally within the purview of the invention to provide a discrete prime mover (e.g., an electric motor) for at least one of the pumps 14 and 20 (see the motor 40). The discrete prime mover 40 can be operated in dependency upon one or more predetermined operational parameters, such as one or more parameters of a motor vehicle or of an engine in a motor vehicle. This renders it possible to change the operating point of the respective pump, i.e., one can change the rate of delivery of pressurized fluid and/or the pressure of fluid at the output of the pump (20) which is driven by a discrete prime mover (40).

Those surfaces of the motors 6, 9 for the axially movable flanges 1a, 2a of the sheaves 1, 2 and those surfaces of the cylinder and piston assemblies in the clutches 26, 27 which are acted upon by oil in the circuit including the conduits 21-23 and 25 (i.e., in the conduit wherein the pressure of oil is a function of the magnitude of transmitted torque) should be selected in such a way that an abrupt change of transmitted torque does not entail any, or entails only minimal, slippage of the chain 3 relative to the sheaves 1, 2 and that the slip of the clutch 26 or 27 is zero or that such slip does not exceed a preselected permissible value. The clutch 26 and/or the clutch 27 can be installed downstream of a valve which delays the buildup of oil pressure in the respective chamber 26d, 27d so that any abrupt rise of oil pressure in the cylinder chamber 24a of the torque sensor 24 (e.g., in response to an abrupt increase of the rate of delivery of fuel to the engine 36) causes the then engaged clutch 26 or 27 to initially permit a certain slip of the output member II relative to the output member III. The delay valve then gradually increases the pressure of oil in the chamber 26d or 27d so that the slip is reduced and is ultimately zero, i.e., the output member III begins to rotate at the exact speed of the input member II with a delay which is determined by the valve upstream of the engaged clutch 26 or 27. The delay valve (shown at 41) can be installed in a conduit 34 which connects the conduit 21 with the valve 29. Such mounting in the conduit 34 (which is in parallel with the conduit 21) ensures that the valve 41 cannot influence the buildup of oil pressure in the cylinder chambers 6a, 9a and 11a of the motors 6, 9 and 11.

It is further possible to install the pressure regulating or pressure relief valve 33 in the conduit 23, i.e., upstream of the cylinder chamber 24a.

The power train can comprise a discrete first control unit (e.g., the illustrated control unit 32) for the pressure regulating valve 15, and a discrete second control unit (not shown) for the distributing valve 29 and/or 30. The illustrated design is preferred at this time due to its simplicity.

If the fluid source including the pumps 14 and 20 is replaced with a single pump, such single pump has two outlets for pressurized fluid, namely one for admission of fluid into the conduit 21 and another for admission of fluid into the conduit 16. It is presently preferred to provide the power train with two discrete pumps 14 and 20 for the aforediscussed reasons, i.e., the pump 20 is merely called upon to compensate for losses due to leakage of fluid by way of the outlet port or ports 24e and elsewhere. This pump need not compensate for outflow of fluid from the chamber 9a or 11a when the ratio of the transmission is being changed because the fluid then merely flows from the chamber 11a into the chamber 9a or vice versa by way of the conduits 16a, 34 and distributing valve 29. The required output of the pump 14 is also small. This ensures that combined losses due to leakage are smaller than in conventional power trains. On the other hand, the sum of forces which urge the axially movable flange 1a of the sheave 1 against the chain 3 is not smaller than in conventional power trains using infinitely variable transmissions with adjustable sheaves and endless flexible torque transmitting elements. The utilization of two discrete pumps renders it possible to use conduits having relatively small inner diameters and to employ simpler, more compact and less expensive oil cooling means. In fact, it is even possible to dispense with oil cooling means.

The improved power train can be modified in a number of additional ways. For example, the transmission ratio varying motor 11 can surround the motor 9 for the axially movable flange 1a of the sheave 1. The illustrated construction is preferred at this time because it contributes to compactness and simplicity of the transmission. Thus, the axially movable flange 1a can be integral with the cylinder 8 of the motor 9 and with the piston 13 of the motor 11, and the piston 10 of the motor 9 can be integral with the cylinder 12 of the motor 11.

The package of springs 4 for the axially movable flange 2a of the sheave 2 is preferably designed in such a way that it exhibits a degressive spring characteristic, and this package of springs is preferably installed in such a way that its force (as seen in the axial direction of the output member II) is greater when the upper looped portion of the chain 3 is nearest to the axis of the input member I and that its force is smaller when the upper looped portion of the chain 3 is located at a greater radial distance from the axis of the input member I.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A power train, particularly for use in motor vehicles, comprising at least one engageable and disengageable clutch; fluid-operated means for engaging said at least one clutch; an infinitely variable transmission in series with said at least one clutch, said transmission including a first rotary sheave arranged to receive torque from a prime mover, a second rotary sheave connected with said at least one clutch, and an endless flexible torque transmitting element trained over said sheaves, each of said sheaves comprising a first flange and a second flange movable axially toward and away from the respective first flange, said transmission further comprising first and second fluid-operated motors for the respective second flanges; a torque sensor connected with the prime mover; means for varying the ratio of said transmission; at least one source of pressurized fluid; a first circuit connecting said at least one source with said motors and with said torque sensor; and a second circuit connecting said at least one source with said varying means and/or with said engaging means, said second circuit comprising an adjustable pressure regulating device.

2. The power train of claim 1, wherein at least one of said motors includes a cylinder and piston unit.

3. The power train of claim 1, wherein said varying means comprises a further fluid-operated motor having means for moving the second flange of one of said sheaves, said pressure regulating device comprising a valve and further comprising at least one control unit having means for adjusting said valve as a function of at least one of a plurality of different parameters.

4. The power train of claim 3, wherein said at least one parameter is a parameter of the prime mover.

5. The power train of claim 3, further comprising means for selectively connecting said valve with said engaging means or with said further motor.

6. The power train of claim 5, wherein said connecting means is adjustable to connect said valve with said engaging means preparatory to start of transmission of torque from the prime mover to said transmission.

7. The power train of claim 5, wherein said at least one clutch is a friction clutch and said connecting means is adjustable to connect said valve with said further motor and to connect said engaging means in said first circuit immediately or at least shortly upon complete engagement of said at least one clutch.

8. The power train of claim 5, wherein said connecting means comprises a distributing valve in said circuits, said distributing valve being connected with said engaging means and with said varying means.

9. The power train of claim 8, wherein said distributing valve is further connected with the valve of said pressure regulating device.

10. The power train of claim 8, wherein said distributing valve is a 5/3-way valve.

11. The power train of claim 8, wherein said distributing valve is a 5/2-way valve.

12. The power train of claim 8, wherein said prime mover includes a fuel consuming engine and said distributing valve is connected with and is adjustable by said at least one control unit as a function of at least one of said plurality of different parameters, said parameters including the rate of delivery of fuel to the engine, the RPM of the engine, the RPM of the second sheave, and the position of a gear shift member for the engine.

13. The power train of claim 3, wherein said prime mover comprises a fuel consuming engine and said valve is an electrically adjustable valve, said parameters including the rate of delivery of fuel to the engine, the RPM of the engine, the RPM of the second sheave and the position of a gear shift member for the engine.

14. The power train of claim 1, wherein said at least one source includes a first pump in said first circuit and a second pump in said second circuit.

15. The power train of claim 14, further comprising a pressure relief valve in said second circuit between said second pump and a valve of said pressure regulating device.

16. The power train of claim 1, comprising two fluid-operated engageable and disengageable clutches in series with said second sheave, said engaging means including means for selectively engaging one of said clutches at a time and further comprising a planetary connected with and arranged to receive torque from one of said clutches.

17. The power train of claim 16, further comprising a rotary output member, said one clutch having means for rotating said output member through said planetary in a first direction and the other of said clutches having means for rotating said output member in a second direction counter to said first direction.

18. The power train of claim 16, further comprising means for selectively connecting said pressure regulating device with said engaging means or with said varying means, said connecting means comprising a first distributing valve and said engaging means comprising a second distributing valve which is adjustable to connect said first distributing valve with the one or the other of said clutches.

19. The power train of claim 18, wherein said second distributing valve is a 4/2-way valve.

20. The power train of claim 16, wherein at least one of said clutches comprises a substantially piston-like portion which is movable in a first direction to effect the engagement and in a second direction to effect the disengagement of the at least one clutch, and further comprising means for yieldably biasing said substantially piston-like portion in said first direction.

21. The power train of claim 20, wherein said biasing means comprises at least one spring.

22. The power train of claim 1, wherein said torque sensor comprises a valve connected in said first circuit and having at least fluid discharging outlet, and further comprising a pressure regulating valve in said outlet.

23. The power train of claim 22, wherein said at least one clutch includes a substantially piston-like portion which is movable in a first direction for engagement and in a second direction for disengagement of said at least one clutch, and means for yieldably biasing said substantially piston-like portion in said first direction with a predetermined force, said pressure regulating valve being operative to maintain the fluid pressure therein at a value such to at least substantially compensate for said predetermined force.

24. The power train of claim 1, wherein said varying means comprises a further fluid-operated motor arranged to move the second flange of said first sheave and operating in parallel with said first motor.

25. The power train of claim 1, wherein said transmission further comprises means for yieldably biasing one of said second flanges toward the respective first flange.

26. The power train of claim 25, wherein said one second flange is the second flange of said second sheave.

27. The power train of claim 25, wherein said biasing means comprises at least one spring 28. The power train of claim 25, wherein said biasing means comprises a package of dished springs.

* * * * *